Patented Oct. 7, 1952

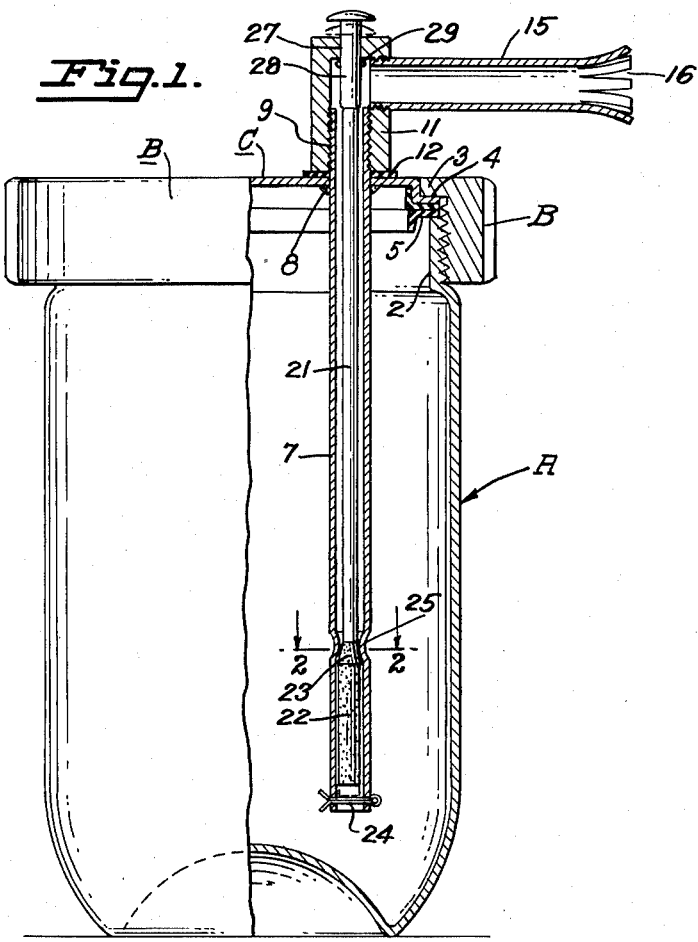
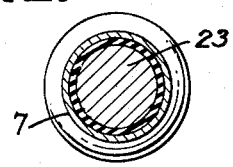

2,613,016

UNITED STATES PATENT OFFICE 2,613,016

DISPENSER FOR VISCOUS LIQUIDS AND VALVE THEREFOR

Jerry Jarrett and Hal C. Berggren, San Francisco, Calif., assignors to The National Dispenser Corp., San Francisco, Calif., a corporation of California Application January 14, 1949, Serial No. 70,944

3 Claims. (Cl. 222—394)

1

This invention relates to dispensers and more particularly to a dispenser for viscous liquids under pressure and a valve therefor.

A particular use of the present invention is for the dispensing of viscid liquids having food value, such as whipped cream or the like, and where cleanliness and sanitation is a paramount and primary consideration. A defect in prior dispensers has been in the fact that liquids dispensed under pressure, such as whipped cream, utilize a coil spring biased check valve of conventional design, commonly known as a tire valve, and in such a valve the food clogs the valve occasioned by the spring construction thereof and is a serious impediment to cleanliness and sanitation.

In the present invention a valve is utilized which is urged or biased to closed position by the liquid contained in the dispenser under pressure and does not depend upon springs or other similar mechanisms in order to prevent leakage from the container when not in use. Further in the present invention the valve construction is simplified for purposes of cleanliness and sanitation in order that it may be easily washed or otherwise cleaned after the container has been emptied of its charge. For purposes of example in the present invention, the use of the dispenser and valve therefor will be directed to the dispensing of whipped cream.

It is present practice to fill a container with cream and then charge the container with nitrous oxide under pressure of approximately 180 pounds per square inch. Then, through a valve mechanism, the cream is released to atmosphere under pressure and the nitrous oxide aerates the cream to form whipped cream which may be dispensed on various food products, such as pies, pastries or fountain products of various types. The present invention is directed to improvements in dispensers for whipped cream or the like, and the valve mechanism hereinafter described is adapted to enable the easy cleaning and convenient dispensing of the cream as desired.

A specific object of the present invention is to provide a dispenser and a valve therefor which enables aeration of the cream prior to its discharge to the object upon which the whipped cream is to be laid.

A further object of the present invention is to provide a dispenser and valve therefor which is simple in construction and has no spring mechanism to weaken or become incapable of proper function.

A further object is to provide a sturdy valve

2 mechanism which is biased to closed position by the pressure of the liquid which it is adapted to dispense.

Other objects and advantages will become apparent upon referring to the specification and accompanying drawings in which similar characters of reference represent corresponding parts in the several views.

Fig. 1 is a side elevational view partially in section showing the valve mechanism attached to the dispenser unit and showing the valve mechanism in closed position in full lines and in open position in broken lines.

Fig. 2 is an enlarged sectional view taken on line 2—2 of Fig. 1 showing the valve closed.

The dispenser comprises preferably a cylindrical container, generally indicated at A, and preferably formed of steel or other suitable material and arranged to contain a liquid under pressure. Normally the pressure of the liquid contained in the container A is approximately at 180° per square inch or thereabouts.

The top of the container is necked-in slightly as at 2 and provided with an exterior thread to receive threadedly a top piece B. The top piece B is provided with an inner annular flange 3 which overlies and extends inwardly of the portion 2 of the container body A. A container top, indicated generally at C, comprises a plate provided with a downwardly and outwardly extending rim portion 4 which said portion 4 is arranged to overlie the top of portion 2 of container body A and underlie flange 3. Gasket member 5 formed of rubber or other suitable material is disposed below the rim portion 4 of top C to act as an effective seal piece between the container A and the top B.

The top C is provided with an aperture through which is disposed a tube 7 which extends interiorly of the container A to adjacent the bottom thereof. The tube 7 is provided with a burr or burrs 8 which abut against the bottom of the top C to limit slidable movement of the tube upwardly through the said aperture provided in the said top. A portion of the tube 7 projects above the top C and is threaded exteriorly, as at 9, to receive an interiorly threaded hollow cap member 11. Disposed between the bottom of the cap 11 and the top C is a rubber gasket or other suitable seal member 12. A dispenser nozzle or pipe 15 is threadedly attached to the cap 11 and is in flow communication with the hollow interior thereof and at approximate right angles to the longitudinal axis of tube 7. Preferably the dispensing end of the pipe 15 is serrated as at 16, and the serrations are flared or expanded radially outwardly in order to enhance the dispensing characteristics of the unit.

Disposed slidably longitudinally within the tube 7 is a stem or piston 21 provided at the bottom end thereof with an enlarged portion or plug 22 having a tapered end 23. The plug 22 is preferably rubber coated, as indicated in Fig. 2, or formed entirely of rubber or other suitable sealing material. A pin 24 is disposed through the tube at the bottom end thereof to limit slidable movement of the stem downwardly.

The tube 7 is provided with a reduced diameter portion 25 by necking the tube inwardly. The necked-in portion 25 of tube 7 is tapered or formed to coincide with the tapered end 23 of plug 22 to form a valve seat therefor.

The top of the cap member 11 is provided with a bore 27 in axial alignment with the interior of the tube 7 and is arranged to receive slidably a control member 28. The bottom of the control member 28 is arranged to abut against the top of the stem 21, and when the control member is depressed against the stem 21, it acts to open the valve comprising the plug 22 and necked-in or reduced diameter portion 25 of the tube 7. The stem of the control member 28 is provided with burrs 29 to limit slidable movement of the said control member outwardly from engagement with the cap member 11. It is noted that the slidable movement of the member 28 through bore 27 is limited by such tolerances as to prevent escape of the liquid contents of the dispenser therethrough.

In operation, and assuming that cream is in the container body A and has been charged with nitrous oxide under pressure, the control pin or member 28 is depressed downwardly from the full line position to the broken line position which, in turn, operates to move the stem member 21 downwardly to open the valve comprising the plug 22 and seat 25 to enable escape of the liquid under pressure in the container upwardly through the tube 7 into the hollow interior of the cap member 11, and thence outwardly through pipe 15 for application.

When manual pressure on the control member 28 is released the liquid under pressure within the container member A automatically biases the valve closed. That is, the pressure in the container forces the plug 22 upwardly to close the valve to prevent escape of liquid through the reduced diameter or necked-in portion 25 of the tube 7.

It is to be noted that the stem 21, positioned slidably and spaced concentrically within the tube 7, allows the cream which is discharged upwardly through the tube to be aerated during the time that it is being discharged upwardly into the hollow interior of cap 11. The pipe 15 is disposed at right angles to the tube 7, and the top of the cap member and acts as a baffle or brake which further aerates the material being discharged, and therefore, occasions, in the case of cream, a very satisfactory whipping of the material before it is dispensed finally. In this capacity tube 7 and cap 11 act as expansion chambers in order to allow for the proper aeration of the material being dispensed.

In addition to the advantages hereandbefore set forth, it is to be noted that the dispensing members may be disassembled for easy cleaning, and there are no spring parts or similar parts to act as traps for the food materials being dispensed, and, therefore, there is no part of the apparatus which would serve as a trap for the germination of harmful bacteria, such has been the case in heretofore dispensing devices of the subject type.

Even though the material contained in the container body A may be charged originally under a pressure of approximately 180 pounds per square inch, by the arrangement of parts particularly the expansion chambers or aeration chambers, comprising the tube 7 and the cap member 11 and arrangement of dispenser pipe 15, the material when dispensed from the serrated end of pipe 15 is laid or very slowly ejected rather than squirted or ejected too quickly for proper application to the object upon which it is desired to use the whipped cream.

While the invention has been described in rather complete detail by way of example for purposes of clarity of understanding, it is understood that various changes, modifications and variations of use, structure and assembly may be practiced within the spirit of the invention and the scope of the appended claims.

We claim:

1. A dispenser for viscous liquids comprising a container arranged to carry a viscous liquid under pressure, a tube arranged interiorly of said container, the bottom end of said tube being disposed adjacent the bottom of said container and the other end of said tube projected outwardly and above the top of said container, a piston disposed longitudinally and slidably within said tube and spaced concentrically therefrom, a plug carried by the bottom end of said piston and positioned adjacent the bottom of said tube, a reduced diameter portion formed in said tube near the bottom thereof, a portion of said plug and said reduced diameter portion forming a valve, the portion of said tube above said reduced diameter portion forming a first aeration chamber, a hollow cap forming a second aeration chamber attached to the top of said tube and positioned above the top of said container, a dispensing pipe in flow communication with the interior of said cap member and attached thereto, and a manually accessible control member carried slidably by said cap and arranged to coact with the top of said piston whereby said piston may be moved slidably and longitudinally within said tube to open said valve, said valve being biased to closed position by said viscous liquid under pressure, said valve being positioned remote from said dispensing pipe to provide an elongated first aeration chamber for viscous liquids passing through said tube prior to entrance into said second aeration chamber.

2. A dispenser for viscous liquids under pressure comprising a container for said liquids, a tube disposed within said container, the bottom end of said tube being disposed adjacent the bottom of said container and the other end of said tube projecting exteriorly of said container, a hollow cap member attached to the end of said tube disposed exteriorly of said container, a piston disposed slidably within said tube and spaced concentrically therefrom, a plug carried by the bottom end of said piston and positioned adjacent the bottom of said tube, said tube having a reduced diameter portion near the bottom end thereof, said reduced diameter portion forming a valve seat for said plug, a control member carried by said cap member and arranged to coact with the top of said piston whereby upon movement of said control member said plug is moved away from said valve seat, the portion of said tube above said reduced diameter portion and in said hollow cap member comprising first and second aeration chambers respectively for said liquid being dispensed, said valve being biased to closed position by said viscous liquid under pressure, said first aeration chamber being elongated and extending the greater part of the length of said container.

3. A dispenser according to claim 2 and wherein a dispenser nozzle is attached to said cap member and in flow communication with the interior thereof and is disposed substantially normal to the longitudinal axis of said tube.

JERRY JARRETT.
HAL C. BERGGREN.

REFERENCES CITED

The following references are of record in the file of this patent:

UNITED STATES PATENTS

| Number | Name | Date |
|---|---|---|
| Re. 22,045 | Towart | Mar. 2, 1942 |
| 2,281,604 | Smith | May 5, 1942 |
| 2,324,162 | Hubenet | July 13, 1943 |
| 2,363,521 | Grant | Nov. 28, 1944 |
| 2,376,052 | Hacmac | May 15, 1945 |